(12) United States Patent
Imaki

(10) Patent No.: US 9,948,570 B2
(45) Date of Patent: Apr. 17, 2018

(54) STREAM DATA PROCESSING METHOD AND STREAM DATA PROCESSING DEVICE

(71) Applicant: Hitachi, Ltd., Tokyo (JP)

(72) Inventor: Tsuneyuki Imaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 32 days.

(21) Appl. No.: 15/126,705

(22) PCT Filed: Oct. 27, 2014

(86) PCT No.: PCT/JP2014/078472
§ 371 (c)(1),
(2) Date: Sep. 16, 2016

(87) PCT Pub. No.: WO2016/067335
PCT Pub. Date: May 6, 2016

(65) Prior Publication Data
US 2017/0093738 A1 Mar. 30, 2017

(51) Int. Cl.
*H04L 12/875* (2013.01)
*H04L 12/26* (2006.01)

(52) U.S. Cl.
CPC ............ *H04L 47/56* (2013.01); *H04L 43/106* (2013.01)

(58) Field of Classification Search
None
See application file for complete search history.

(56) References Cited

U.S. PATENT DOCUMENTS

| 8,391,164 B2 | 3/2013 | Cormode et al. | |
| 2009/0172059 A1* | 7/2009 | Cormode | H04L 43/00 708/274 |
| 2011/0064091 A1* | 3/2011 | Darras | H04J 3/0673 370/458 |
| 2011/0196999 A1* | 8/2011 | Greene | H04L 47/56 710/106 |
| 2015/0009840 A1* | 1/2015 | Pruthi | H04L 43/106 370/252 |
| 2015/0149507 A1 | 5/2015 | Imaki et al. | |

(Continued)

FOREIGN PATENT DOCUMENTS

WO 2014/041673 A1 3/2014

OTHER PUBLICATIONS

International Search Report of PCT/JP2014/078472 dated Dec. 9, 2014.

*Primary Examiner* — Chirag Shah
*Assistant Examiner* — Amar Persaud
(74) *Attorney, Agent, or Firm* — Mattingly & Malur, PC

(57) ABSTRACT

An input tuple including a data time stamp is assigned by a data source; a pending tuple in which a system time stamp at the time the input tuple was received is assigned to the input tuple; and the pending tuple is stored in a queue, one queue for each data source. The queues are sorted in the order of the data time stamps of the pending tuples at the head of each queue; and if, in the queue at the head of which is stored the pending tuple having the smallest data time stamp value, the value of the current system time stamp is greater than the value of a processing pending period added to the system time stamp of the pending tuple at the head of the queue, then the input tuple is acquired from the pending tuple at the head of the queue for an input stream.

10 Claims, 12 Drawing Sheets

(56) References Cited

U.S. PATENT DOCUMENTS

| | | | |
|---|---|---|---|
| 2015/0215193 A1* | 7/2015 | Kim | H04L 43/106 370/252 |
| 2016/0099856 A1* | 4/2016 | Ramaswamy | G06F 17/30044 707/748 |
| 2017/0155696 A1* | 6/2017 | Dong | H04L 65/4069 |
| 2017/0286486 A1* | 10/2017 | Pang | G06F 17/30466 |
| 2017/0286496 A1* | 10/2017 | Pang | G06F 17/30595 |

* cited by examiner

STREAM DATA PROCESSING METHOD AND STREAM DATA PROCESSING DEVICE

BACKGROUND

This invention relates to a technology for improving the precision of stream data processing.

Stream data processing by which high rate data is processed in real time is attracting attention against the background of increased need to analyze in real time successive pieces of information that are generated at a high rate and take action instantaneously in response to a critical event in automated stock transaction, faster traffic information processing, click stream analysis, and the like.

With stream data processing, which is a versatile middleware technology applicable to various types of data processing, real-world data can be reflected on a business in real time while dealing with rapid changes to business environment that give no time to build a system for each individual case.

A stream processed in stream data processing is time-series data in which tuples, i.e., pieces of time-stamped data, arrive at a stream data processing server in succession. A user of stream data processing defines a rule for monitoring the stream as a query, and the stream data processing server converts the query definition into a query graph.

A query graph is a directed graph in which the unit of processing called an operator is a node and a tuple queue between operators is an edge. An input stream is processed in the manner of a data flow by putting individual tuples that make up the input stream through the stream's query graph.

Being data flow-type processing, this processing can process a query graph that is divided into multiple stages in parallel in the manner of a pipe line with the use of a plurality of computer resources. U.S. Pat. No. 8,391,164 B2 and WO 2014/041673 A1 are known as technologies that use parallel processing to process stream data output from a plurality of data sources.

The technology disclosed in U.S. Pat. No. 8,391,164 B2 combines a plurality of pieces of stream data before processing the stream data. The technology disclosed in WO 2014/041673 A1 provides an independent work area for each of a plurality of pieces of stream data.

SUMMARY

Pieces of stream data from a plurality of data sources may not arrive at the stream data processing server in the order of the time stamps of tuples due to delays in paths from the data sources to the stream data processing server, or for some other reasons (out-of-order cases).

U.S. Pat. No. 8,391,164 B2 uses a damping function of a tuple and a time stamp related to the current time to weight each tuple. The damping function assigns a heavier weight to a tuple having a later time stamp, which gives U.S. Pat. No. 8,391,164 B2 a problem in that the correct order of the time stamps of tuples cannot be maintained in the out-of-order cases (the reversal of order) described above. In WO 2014/041673 A1, work areas are made independent of one another to partially sort tuples of the same data source. A problem of WO 2014/041673 A1 is that the overall order of the tuples is indeterminate.

This invention has been made in view of the problems described above, and an object of this invention is therefore to maintain the order of the time stamps of tuples in stream data processing.

A representative aspect of the present disclosure is as follows. A stream data processing method for processing, on a computer comprising a processor and a memory, input tuples that are received from a plurality of data sources, the stream data processing method comprising: a first step of setting, by the computer, a processing holdback period by the computer; a second step of receiving, by the computer, the input tuples comprising data time stamps that are attached by the plurality of data sources and identifiers of the plurality of data sources; a third step of generating, by the computer, a holdback tuple by attaching to each of the received input tuples a system time stamp that indicates a time of reception of the each of the received input tuples; a fourth step of storing, by the computer, the holdback tuple in a data source-based queue that is associated with the identifier of the data source of the holdback tuple; a fifth step of reading, by the computer, data time stamps of hold back tuples at heads of the data source-based queues, and sorting the data source-based queues in an order of the data time stamps of the head holdback tuples; a sixth step of identifying, by the computer, a data source-based queue that stores at a head a holdback tuple that has a smallest data time stamp value, reading a system time stamp of the head holdback tuple, and determining whether or not a current system time stamp value is larger than a value that is obtained by adding the processing holdback period to the read system time stamp; a seventh step of obtaining, by the computer, when it is determined that the current system time stamp value is larger, an input tuple from the head holdback tuple of the identified data source-based queue, and putting the obtained input tuple into an input stream; and an eighth step of executing, by the computer, a given query for the input tuple put into the input stream.

According to this invention, stream data processing can be executed while maintaining the order of the time stamps of input tuples.

DETAILED DESCRIPTION OF THE
PREFERRED EMBODIMENTS

An embodiment of this invention is described below with reference to the accompanying drawings.

Figure 1:
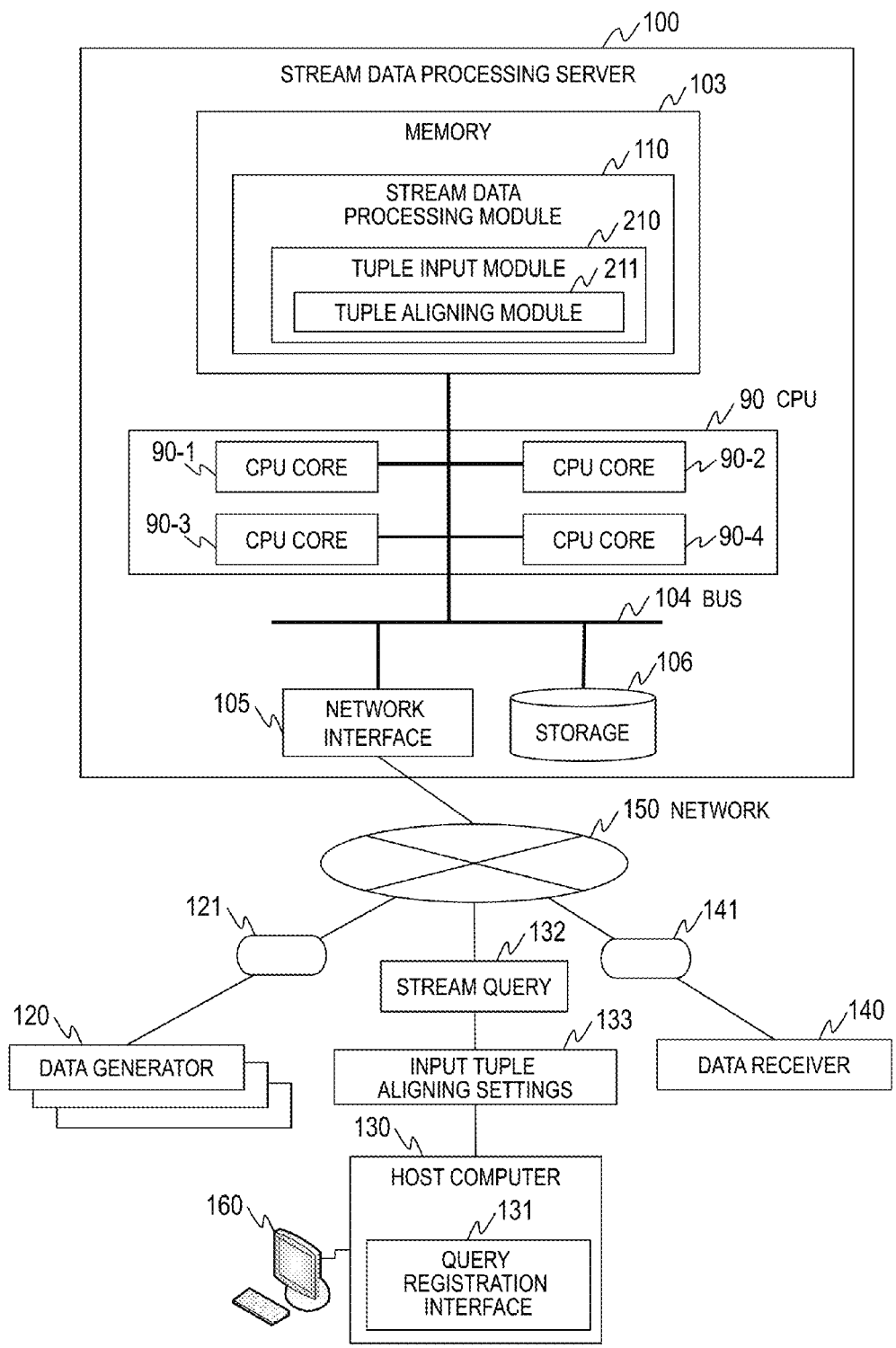
FIG. 1 is a block diagram for illustrating an example of a computer system in which stream data is processed according to an embodiment of this invention.

FIG. 1 is a block diagram for illustrating an example of a computer system in which stream data is processed. A stream data processing server 100 is a computer that includes a CPU 90, a memory 103, a network interface 105, storage 106, and a bus 104. The CPU 90 includes CPU cores 90-1 to 90-4. The memory 103 holds data and programs. The network interface 105 is coupled to a network 150. The storage 106 stores data and programs. The bus 104 couples those computer resources to one another.

The memory 103 stores a stream data processing module 110 configured to define stream data processing. The stream data processing module 110 is a running image executable by the CPU cores (or arithmetic cores) 90-1 to 90-4.

The stream data processing server 100 is coupled to the network 150 via the network interface 105. A host computer 130 coupled to the network 150 includes a registration interface 131 through which the specifics of a query and settings for aligning tuples are registered. A user of the host computer 130 generates a stream query 132, which defines a query, and input tuple aligning settings 133, which define parameters for aligning tuples, and transmits the generated query and settings to the stream data processing server 100 via the registration interface 131. The input tuple aligning settings 133 include, as described later, parameters used by a tuple aligning module 211 to sort tuples that arrive at the stream data processing server 100 (hereinafter referred to as "input tuples 121") in the order of data time stamps attached to the input tuples 121. The host computer 130 receives an input from the user and displays an output from the stream data processing server 100 or from other components by way of an input/output device 160.

Receiving the input tuple aligning settings 133 from the host computer 130, the stream data processing server 100 uses a tuple input module 210 of the stream data processing module 110 to align the input tuples 121 received from a plurality of data sources in the order of data time stamps. The tuple input module 210 includes the tuple aligning module 211 configured to align the input tuples 121 received from a plurality of data sources in the order of data time stamps, based on the specifics of the input tuple aligning settings 133 that are received from the host computer 130.

Receiving the stream query 132 from the host computer 130, the stream data processing server 100 uses the stream data processing module 110 to build a query graph with which stream data processing conforming to the received query definition (the stream query 132) can be executed.

The stream data processing server 100 receives the input tuples 121 transmitted from data generators (data sources) 120, which are coupled to the network 150. Each input tuple 121 is data to which a data time stamp and a data source identifier are attached. The data time stamp is a time stamp attached by the data source (the data generator 120) when the input tuple 121 is transmitted.

At least one data generator 120 is included in the computer system, and each data generator 120 serves as a data source. The stream data processing server 100 receives the input tuples 121 (stream data) from a plurality of data sources.

After the tuple aligning module 211 of the tuple input module 210 aligns the received input tuples 121 in the order of data time stamps, the stream data processing server 100 processes the tuples in a manner defined by the query graph, and generates output tuples 141. The stream data processing server 100 transmits the output tuples 141 to a result receiving computer 140, which is coupled to the network 150.

The storage 106 of the stream data processing server 100 is configured to store a running image of the stream data processing module 110 and also a text file of the stream query 132 that has been received once. The stream data processing module 110 may build a query graph by loading this query file from the storage 106 when activated.

The stream data processing module 110 and other function modules are loaded onto the memory 103 as programs. The CPU 90 processes data as programmed by the programs of the function modules, thereby operating as function modules that provide given functions. For instance, the CPU 90 functions as the stream data processing module 110 by processing data as programmed by a stream data processing program. The same applies to other programs. The CPU 90 also operates as function modules that provide the functions of a plurality of processing procedures executed by the programs. A computer and a computer system are an apparatus and a system that include such function modules.

Programs, tables, and other types of information for implementing the functions of the stream data processing module 110 can be stored in the storage 106, a non-volatile semiconductor memory, a storage device that is a hard disk drive, a solid state drive (SSD) or the like, or a computer-readable non-transitory data storage medium that is an IC card, an SD card, a DVD, or the like.

Figure 2A:
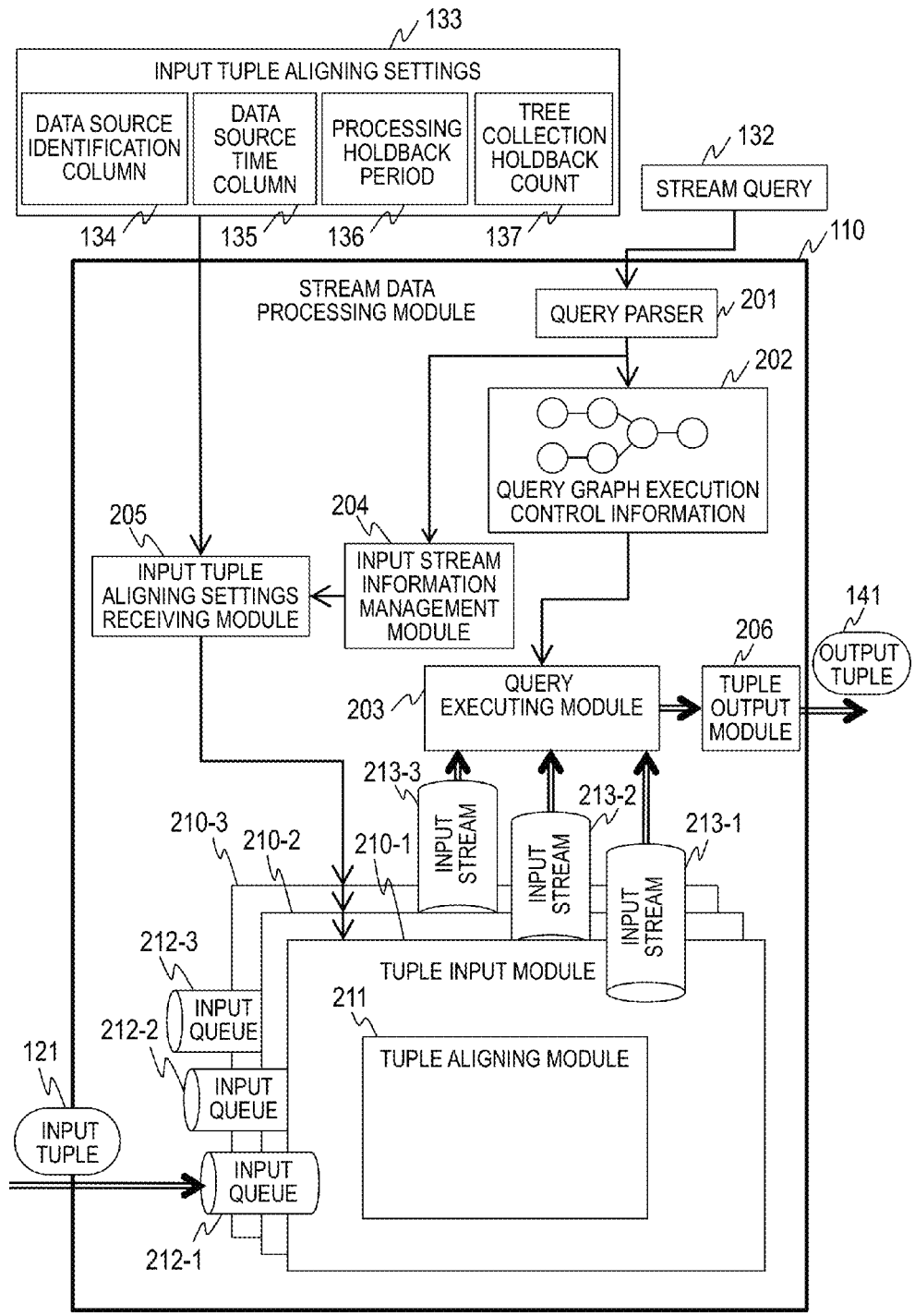
FIG. 2A is a block diagram for illustrating an example of a stream data processing module according to the embodiment of this invention.
Figure 2B:
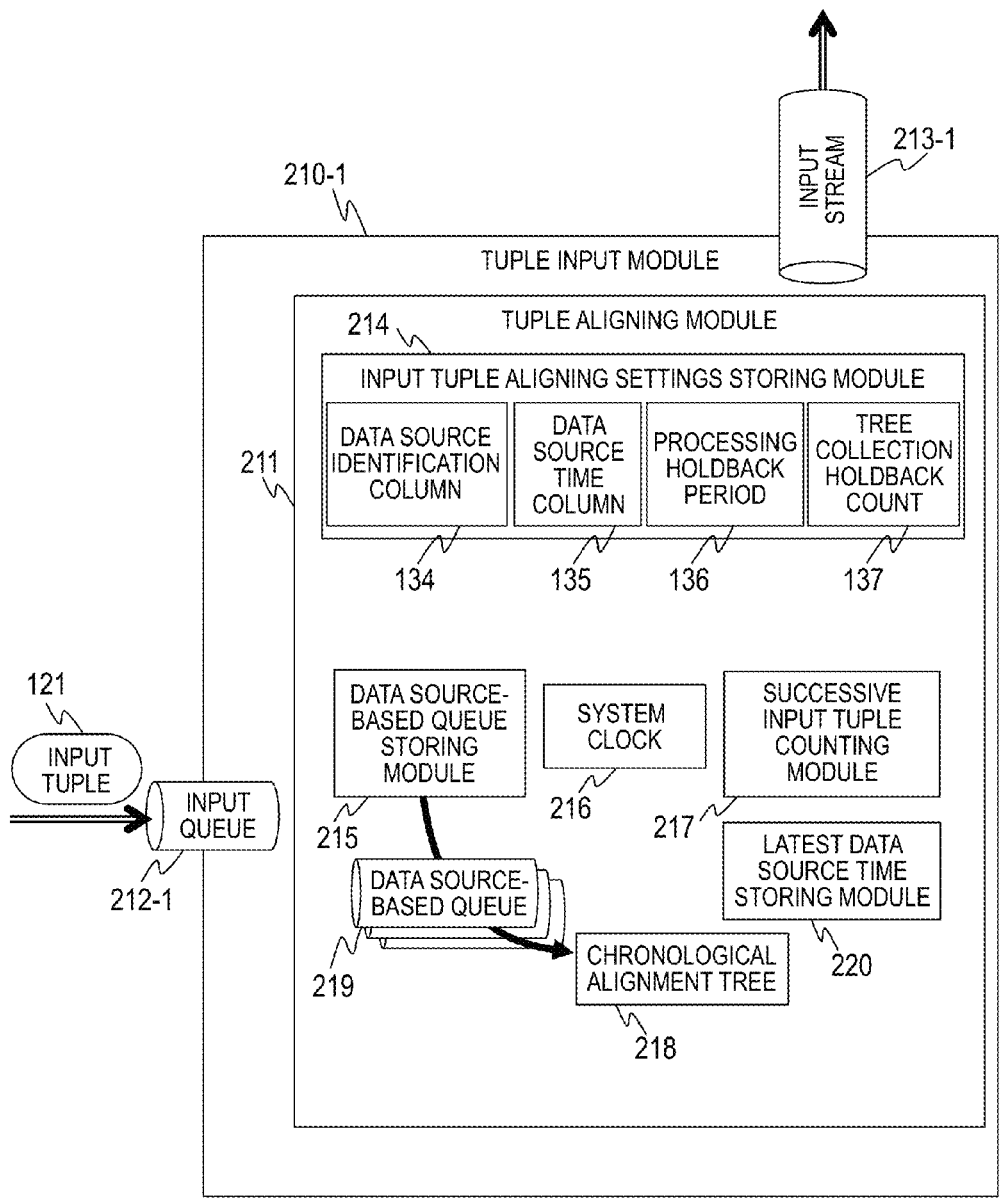
FIG. 2B is a block diagram for illustrating an example of a tuple aligning module according to the embodiment of this invention.

FIG. 2A and FIG. 2B are block diagrams for illustrating an example of stream data processing. An example of the stream data processing module 110 is illustrated in the block diagram of FIG. 2A. An example of the tuple input module 210 is illustrated in the block diagram of FIG. 2B.

In FIG. 2A, a query parser 201 converts the stream query 132 into query graph configuration information 202 when the user operates the host computer 130 to register the stream query 132. A query executing module 203 processes the query graph configuration information 202 to determine the order of executing operators that make up the query graph. The processing of determining the order of executing operators can use a well-known technology, for example, the technology of JP 2010-108152 A.

The query parser 201 also notifies an input schema of stream data that is obtained from the stream query 132 to an input stream information management module 204. The input schema indicates the configuration of data covered by the query.

The query executing module 203 executes stream data processing for input tuples that are put into input streams 213-1 to 213-3. The input streams 213-1 to 213-3 are collectively referred to as "input streams 213", and are individually denoted by 213 with suffixes "-1" to "-n". The same applies to other components: components of the same type are denoted individually by a symbol with suffixes "-1" to "-n" and are denoted collectively by the symbol without suffixes.

The input tuples 121 aligned in the order of data time stamps by tuple input modules 210-1 to 210-3 are put into the input streams 213-1 to 213-3 as described later. The tuple input modules 210-1 to 210-3 execute stream data processing of different types from one another, and function independently of one another. The query executing module 203 executes processing separately for each of the input tuples 121 input from the input streams 213-1 to 213-3.

When the user operates the host computer 130 to register the input tuple aligning settings 133, an input tuple aligning settings receiving module 205 receives information of the input tuple aligning settings 133, and inputs the received settings to the tuple input modules 210-1 to 210-3. The tuple input modules 210-1 to 210-3 each have the same configuration, and the following description therefore discusses only the tuple input module 210-1.

The information of the input tuple aligning settings 133 includes a data source identification column 134, which indicates the location of a column where the identifier of a data source (the data generator 120) of each input tuple 121 is stored, a data source time column 135, which indicates the location of a column where the data time stamp of the input tuple 121 is stored, a processing holdback period 136, which determines how long the tuple is to be held back until the tuple is put into the relevant input stream 213 as described later, and a tree collection holdback count 137, which determines a condition for holding back the deletion of a tree as described later.

The data source identification column 134 and the data source time column 135 are information for identifying the location of data in the input tuple 121. The processing holdback period 136 and the tree collection holdback count 137 are values received by the host computer 130 from the user via an input device (not shown), and function as thresholds for starting processing procedures that are described later. The input tuple aligning settings receiving module 205 notifies the input tuple aligning settings 133 received by the stream data processing server 100 to each tuple input module 210.

Based on the received input tuple aligning settings 133, the tuple input module 210 makes a correction in which the input tuples 121 that are input to an input queue 212 are sorted by data source and in the order of data time stamps, and then puts the corrected tuples into the relevant input stream 213.

The input tuples put into the input stream 213 undergo given query processing in the query executing module 203. The result of executing the query is output from a tuple output module 206 as the output tuples 141.

The output tuples 141 in this embodiment are transmitted from the stream data processing server 100 to the result receiving computer 140 illustrated in FIG. 1.

In the tuple input module 210 described above, the tuple aligning module 211 generates holdback tuples 521 by attaching system time stamps of the stream data processing server 100 to the input tuples 121.

The tuple aligning module 211 queues the holdback tuples 521 into a data source-based queue 219 for each data source separately, and makes a correction that is described later in a chronological alignment tree 218 to correct the order of the input tuples 121 to the order of data time stamps. The tuple input module 210 then puts the input tuples 121 that are in the order of data time stamps as a result of the correction in the tuple aligning module 211 into the relevant input stream 213.

FIG. 2B is a block diagram for illustrating an example of the tuple aligning module 211. The tuple aligning module 211 includes an input tuple aligning settings storing module 214 configured to store the input tuple aligning settings 133 that are received from the input tuple aligning settings receiving module 205, a data source-based queue storing module 215 configured to store a queue (or buffer) for each data source of the input tuples 121 separately, a data source-based queue 219 set for each data source separately to store the input tuples 121 (the holdback tuples 521), a chronological alignment tree 218 configured to store the data source-based queues 219 in leaf nodes, a system clock 216 configured to generate a system time stamp, a successive input tuple counting module 217 configured to count the input tuples 121 that are put into the relevant input stream 213, and a latest data source time storing module 220 configured to store the data time stamps of the input tuples 121 put into the input stream 213.

Figure 5:
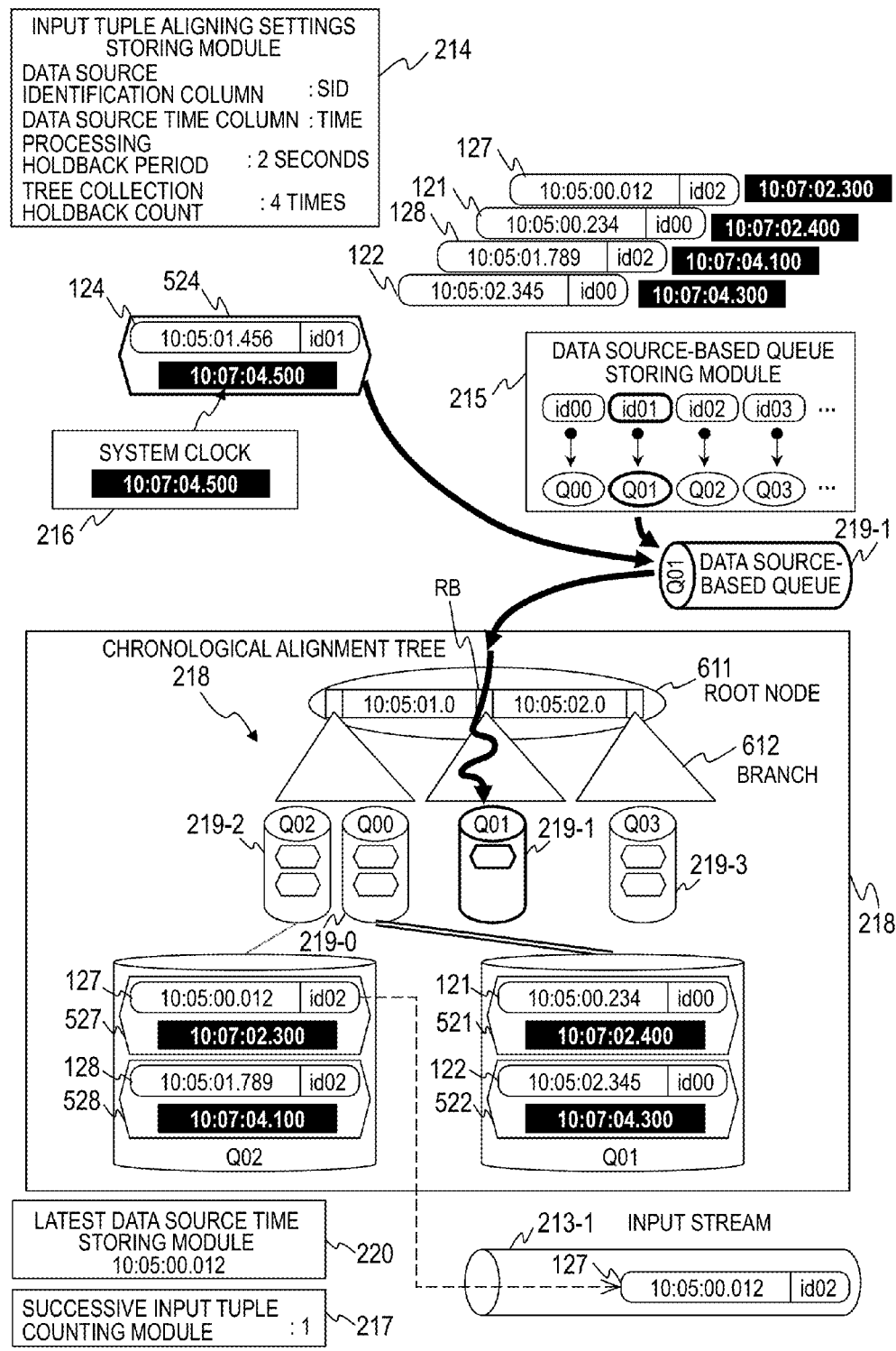
FIG. 5 is a block diagram for illustrating an example of processing in which the tuple aligning module of the stream data processing server corrects the order of the input tuples to the order of data time stamps according to the embodiment of this invention.

The data source-based queue storing module 215 of the example given here stores data source-based queues 219-0 to 219-3 (hereinafter denoted by Q00 to Q03), which are set in association with data source identifiers id00 to id03 as illustrated in FIG. 5.

The tuple aligning module 211 places the data source-based queues Q00 to Q03 in the chronological alignment tree 218 as leaf nodes 613 based on the values of data time stamps of the input tuples 121 (the holdback tuples 521) that are stored in the data source-based queues Q00 to Q03.

The tuple aligning module 211 aligns the data source-based queues Q00 to Q03 in the order of the data time stamps of the input tuples 121 at the heads, and then puts the queued input tuples 121 into the input stream 213 based on the system time stamps as described later.

The input tuples 121 that are put into the input stream 213 from the tuple input module 210 undergo given query processing in the query executing module 203, and are output as the output tuples 141 from the stream data processing server 100.

<Input Tuples and Data Time Stamps>

Figure 4:
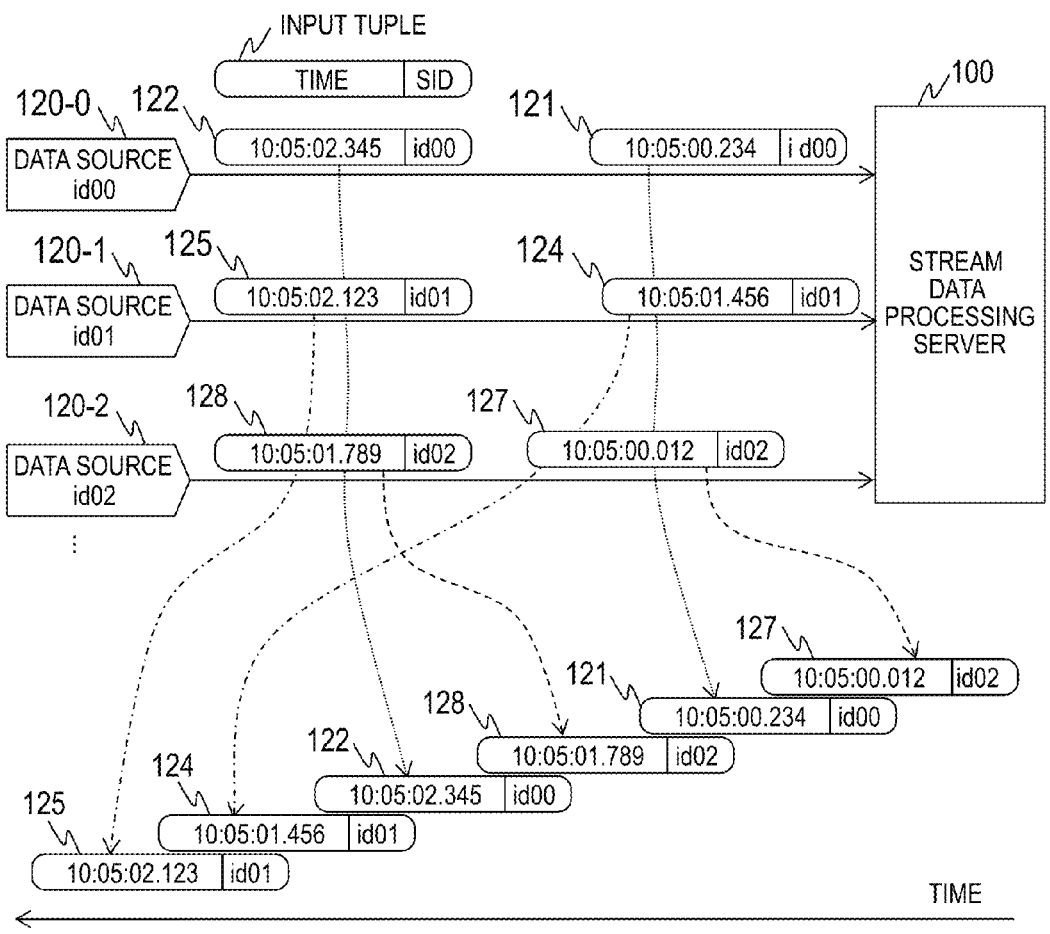
FIG. 4 is a block diagram for illustrating processing in which the stream data processing server receives input tuples on a data source-by-data source basis according to the embodiment of this invention.

FIG. 4 is a block diagram for illustrating processing in which the stream data processing server 100 receives input tuples 121 to 128 on a data source-by-data source basis. The stream data processing server 100 in this invention processes the input tuples 121 to 128 received from a plurality of data generators 120 (hereinafter referred to as data sources 120-0 to 120-2"). In the following description, the input tuples are individually denoted by 121 to 128, and are collectively denoted by 121.

The data sources 120-0 to 120-2 transmit to the stream data processing server 100 the input tuples 121 that are created by attaching data time stamps ("TIME" in FIG. 4) and the identifiers ("SID" in FIG. 4) of the data sources 120 to pieces of data (not shown).

The data sources 120 transmit the input tuples 121 in the order of data time stamps. However, as pointed out in the problem of the related art described above, the input tuples 121 received from all data sources 120 may not arrive at the stream data processing server 100 in the order of data time stamps due to a delay in a communication path or a delay in processing executed on a communication path, or for other reasons.

In the example of FIG. 4, the stream data processing server 100 receives the input tuples 127, 121, 128, 122, 124, and 125 in the order stated. The input tuples 121 from each data source 120 arrive at the stream data processing server 100 in the order of data time stamps. For example, from the data source 120-2, the input tuple 128 having a data time stamp "10:05:01.789" arrives at the stream data processing server 100 after the input tuple 127, which has a data time stamp "10:05:00.012".

The arrival of all input tuples 121 at the stream data processing server 100, on the other hand, is not in the order of data time stamps: the input tuple 124 having a data time stamp "10:05:01.456" arrives after the input tuple 122 having a data time stamp "10:05:02.345". The order of data time stamps is thus reversed between different data sources 120 in some cases.

Unless the query executing module 203 executes processing that puts the input tuple 124 of the data source 120-1 after the input tuple 121 of the data source 120-2 and before the input tuple 128 of the data source 120-2, stream data processing in the order of data time stamps cannot be executed as pointed out in the problem of the related art described above.

A solution of this invention to inconsistency between the arrival order of the input tuples throughout all data sources 120 and the order of data time stamp as in FIG. 4 is to correct the order of the input tuples 121 in the tuple aligning module 211 before putting the input tuples 121 into the input stream 213, thereby enabling the query executing module 203 to execute query processing in the order of data time stamps.

<Tuple Aligning Module>

FIG. 5 is a block diagram for illustrating an example of processing in which the tuple aligning module 211 of the stream data processing server 100 corrects the order of the input tuples 121 to the order of data time stamps.

The tuple aligning module 211 first stores the input tuple aligning settings 133 received from the host computer 130 in the input tuple aligning settings storing module 214. In the example of FIG. 5, "SID" is stored as the data source identification column 134, "TIME" is stored as the data source time column 135, "2 seconds" is stored as the processing holdback period 136, and "4 times" is stored as the tree collection holdback count 137.

In the example of FIG. 5, the stream data processing server 100 receives the input tuples 127, 121, 128, and 122 in the order stated and queues the received input tuples, and then the input tuple 124 is input to an input queue 212-1.

The tuple aligning module 211 obtains the current time from the system clock 216 (a system time stamp) and attaches the system time stamp to the input tuple 124 that has just been input, thereby creating a holdback tuple 524. The tuple aligning module 211 obtains a data source identifier "id01" as the data source identifier of the input tuple 124 that is associated with the value "SID" of the data source identification column 134. A holdback tuple in this embodiment is an input tuple with a system time stamp attached thereto.

The tuple aligning module 211 refers to the chronological alignment tree 218 to determine whether or not the data source-based queue 219 that is associated with the obtained data source identifier is included as one of the leaf nodes 613. When the associated data source-based queue 219 is not included as one of the leaf nodes 613, the tuple aligning module 211 selects from the data source-based queue storing module 215 the data source-based queue 219 that is associated with the obtained data source identifier.

The data source-based queue that is associated with the data source identifier "id01" is Q01 (219-1) in this example. The tuple aligning module 211 therefore stores the holdback tuple 524 in the data source-based queue Q01.

In the case where the data source-based queue Q01 is included as one of the leaf nodes 613, on the other hand, the tuple aligning module 211 adds the new holdback tuple 524 to the tail of the data source-based queue Q01.

When newly inserting the data source-based queue Q01 to the chronological alignment tree 218 (as one leaf node 613), the tuple aligning module 211 selects a branch covering a range that contains the data time stamp of the holdback tuple 524 out of branches 612 coupled to a root node 611, by using the data time stamp as an order key.

The tuple aligning module 211 attaches the current system time stamp of the stream data processing server 100 to the received input tuple 124, and stores the thus created holdback tuple 524 in the data source-based queue Q01.

Thereafter, the tuple aligning module 211 obtains the system time stamp of a holdback tuple that has the smallest (earliest) data time stamp out of holdback tuples at the heads of the data source-based queues 219 in the chronological alignment tree 218. In FIG. 5, the earliest data time stamp among the head tuples is the data time stamp of a holdback tuple 527 in the data source-based queue Q02 which is 10:05:00.012.

The tuple aligning module 211 compares the current system time stamp obtained from the system clock 216 and a value that is obtained by adding the processing holdback period 136 (2 seconds) to the system time stamp of the holdback tuple 527, which has the earliest data time stamp.

Specifically, the tuple aligning module 211 puts the input tuple 127 of the holdback tuple 527 into the input stream 213 when the current system time stamp (10:07:04.500) exceeds a value that is obtained by adding the value "2 seconds" of the processing holdback period 136 to the system time stamp of the holdback tuple 527 (10:07:02.300) (the result of the addition is 10:07:04.300).

By putting into the input stream 213 an input tuple that has the earliest data time stamp among the head tuples of data source-based queues coupled to the chronological alignment tree 218 and repeating this process for the next set of head tuples, processing the input tuples 121 in the order of data time stamps is accomplished as described later.

The tuple aligning module 211 extracts the input tuple 127 from the holdback tuple 527, puts the input tuple 127 into the input stream 213-1 (hereinafter 213), and then adds 1 to the value of the successive input tuple counting module 217. The tuple aligning module 211 also stores in the latest data source time storing module 220 the value of the data time stamp of the input tuple 127 put into the input stream 213.

After putting the head tuple of one data source-based queue 219 into the input stream 213, the tuple aligning module 211 uses as an order key the data time stamp of a holdback tuple that is the new head tuple to move this data source-based queue 219 to the place of the leaf node 613 that corresponds to the order of the data time stamp of the new head tuple.

When the value of the successive input tuple counting module 217 exceeds the tree collection holdback count 137, the tuple aligning module 211 deletes the tree devoid of holdback tuples and collects the tree's computer resources for reallocation.

Through the processing described above, the tuple aligning module 211 attaches a system time stamp to the input tuple 124 to generate the holdback tuple 524, inserts the holdback tuple 524 to the chronological alignment tree 218, sorts the places of the data source-based queues 219 among the leaf nodes 613 in the order of data time stamps.

The tuple aligning module 211 then puts into an input stream the input tuple 121 of a head tuple that has the earliest data time stamp in the case where a time calculated by adding the processing holdback period 136 to the system time stamp of this head tuple is less than the current system time stamp. In other words, the tuple aligning module 211 puts the input tuple 121 of this head tuple into an input stream when the current system time stamp is past a time that is calculated by adding the processing holdback period 136 to the system time stamp of the head tuple.

This enables the stream data processing server 100 to execute query processing after correcting the order of the input tuples 121 received from a plurality of data sources 120 to the order of data time stamps.

This also enables the tuple aligning module 211 to control, with the use of the tree collection holdback count 137, the timing of deleting an empty tree in the chronological alignment tree 218 from which all holdback tuples 521 have been put into the input stream 213. By controlling the timing of empty tree deletion, which is a heavy load on the stream data processing server 100, frequent execution of tree deletion processing can be prevented. An empty tree that can be deleted is a tree that precedes (is earlier than) the data time stamp stored in the latest data source time storing module 220.

<Chronological Alignment Tree>

Figure 6:
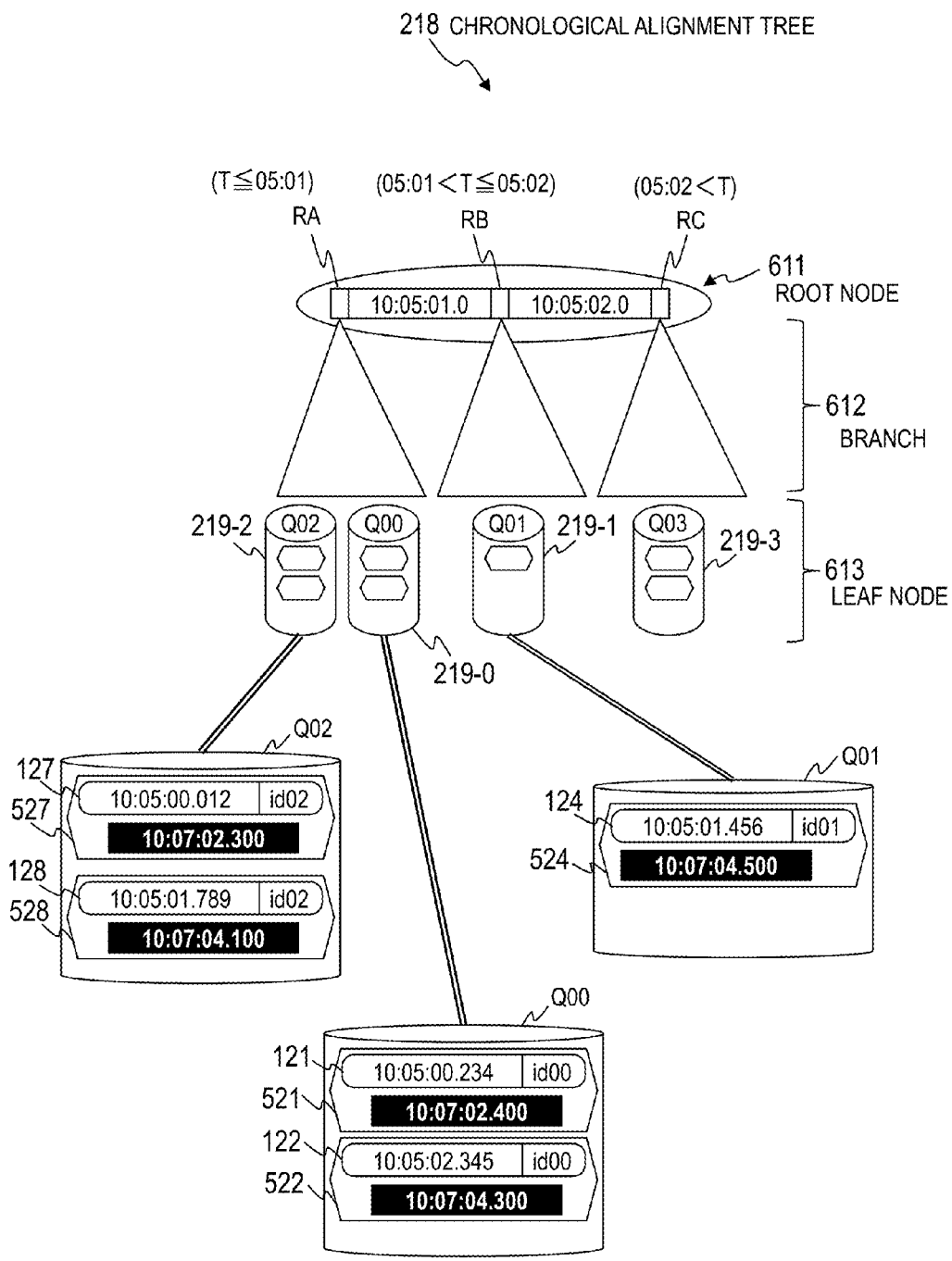
FIG. 6 is a block diagram for illustrating an example of the chronological alignment tree according to the embodiment of this invention.

FIG. 6 is a block diagram for illustrating an example of the chronological alignment tree 218. In the chronological alignment tree 218, the branches 612 (RA, RB, and RC) are coupled to the root node 611 as illustrated in FIG. 6. Each branch 612 has at least one data source-based queue 219 coupled thereto as the leaf node 613 to form a tree.

The branches 612 respectively cover time ranges that are partitioned from one another by order keys (data time stamps) stored in the root node 611, and each branch 612 has the data source-based queue 219 coupled thereto as the leaf node 613 whose data time stamp of the head tuple is included in the time range of the branch 612. A balanced tree is used as an example of the chronological alignment tree 218 in this embodiment. The balanced tree employed in this example is a B+ tree or a B-tree. The chronological alignment tree 218 is not limited to the example, and well-known methods can be employed.

The root node 611 in the example of FIG. 6 stores "10:05:01.0" and "10:05:02.0" as order keys by which the time ranges of the branches 612 (RA, RB, and RC) are partitioned from one another. In FIG. 6, RA is a branch having a time range that is up to and including 10:05:01, RB is a branch having a time range that exceeds 10:05:01 and is up to and including 10:05:02, and RC is a branch having a time range that exceeds 10:05:02.

In FIG. 6, the data source-based queues 219-2 (hereinafter Q02) and 219-0 (hereinafter Q00) are placed in the leaf node 613 of the branch RA. The data time stamp of the head tuple in the data source-based queue Q02 is "10:05:00.012", and the data time stamp of the head tuple in the data source-based queue Q00 is "10:05:00.234". The data source-based queues Q02 and Q00 therefore have a relation Q02<Q00 in terms of the chronological order of the head tuples.

The data source-based queue 219-1 (hereinafter Q01) is placed in the leaf node 613 of the branch RB. The data time stamp of the head tuple in the data source-based queue Q01 is "10:05:01.456". The data time stamps of the head tuples in the data source-based queues Q00 to Q02 are sorted in chronological order (in time series) in the leaf nodes 613.

In each data source-based queue 219, tuples are queued so that the data time stamp value increases from the head tuple toward a holdback tuple at the bottom of the diagram. The time indicated by the data time stamp increases toward a lower part of each data source-based queue 219 in the diagram, for example, from "10:05:00.012" of the head tuple (the holdback tuple 527) to "10:05:01.789" of the next holdback tuple 528 in the data source-based queue Q02 of FIG. 6. In the following description, holdback tuples are collectively denoted by 521 and are individually denoted by 521 to 528.

The branches 612 in the chronological alignment tree 218 of this invention can be determined easily by using as order keys the data time stamps of the head tuples in the leaf nodes 613.

The tuple aligning module 211 sorts the leaf nodes 613 by moving the data source-based queues 219 between the nodes so that the data time stamps of the head tuples maintain the time-series order. In this manner, the order of the input tuples 121 arriving from a plurality of data sources 120 that deviates from the order of data time stamps can be corrected to the order of data time stamps as long as the processing holdback period 136 is not expired.

<Processing of the Tuple Input Module that is Executed in the Tuple Aligning Module>

Figure 3A:
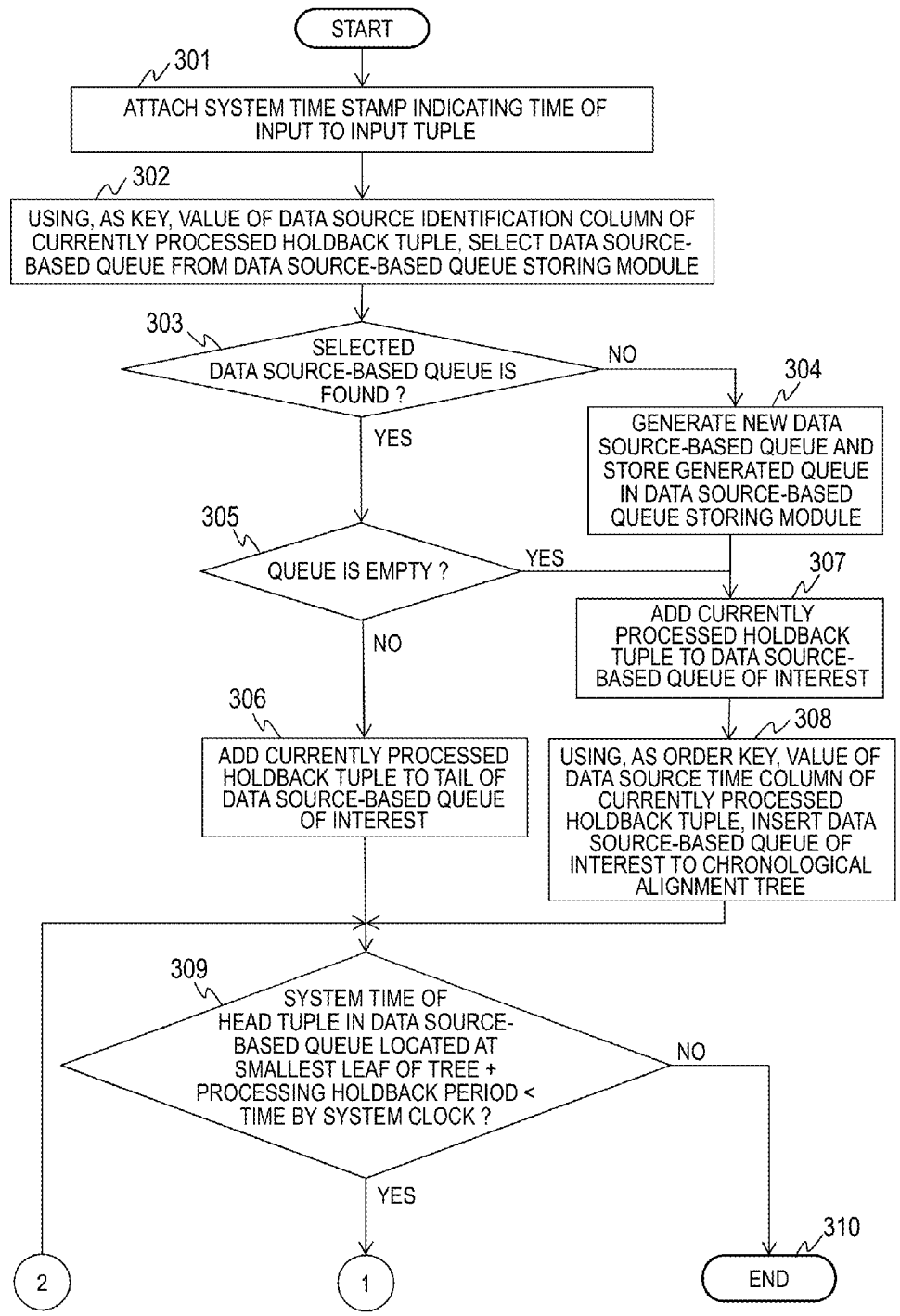
FIG. 3A is the first half of the flow chart for illustrating an example of processing that is executed in the tuple aligning module according to the embodiment of this invention.
Figure 3B:
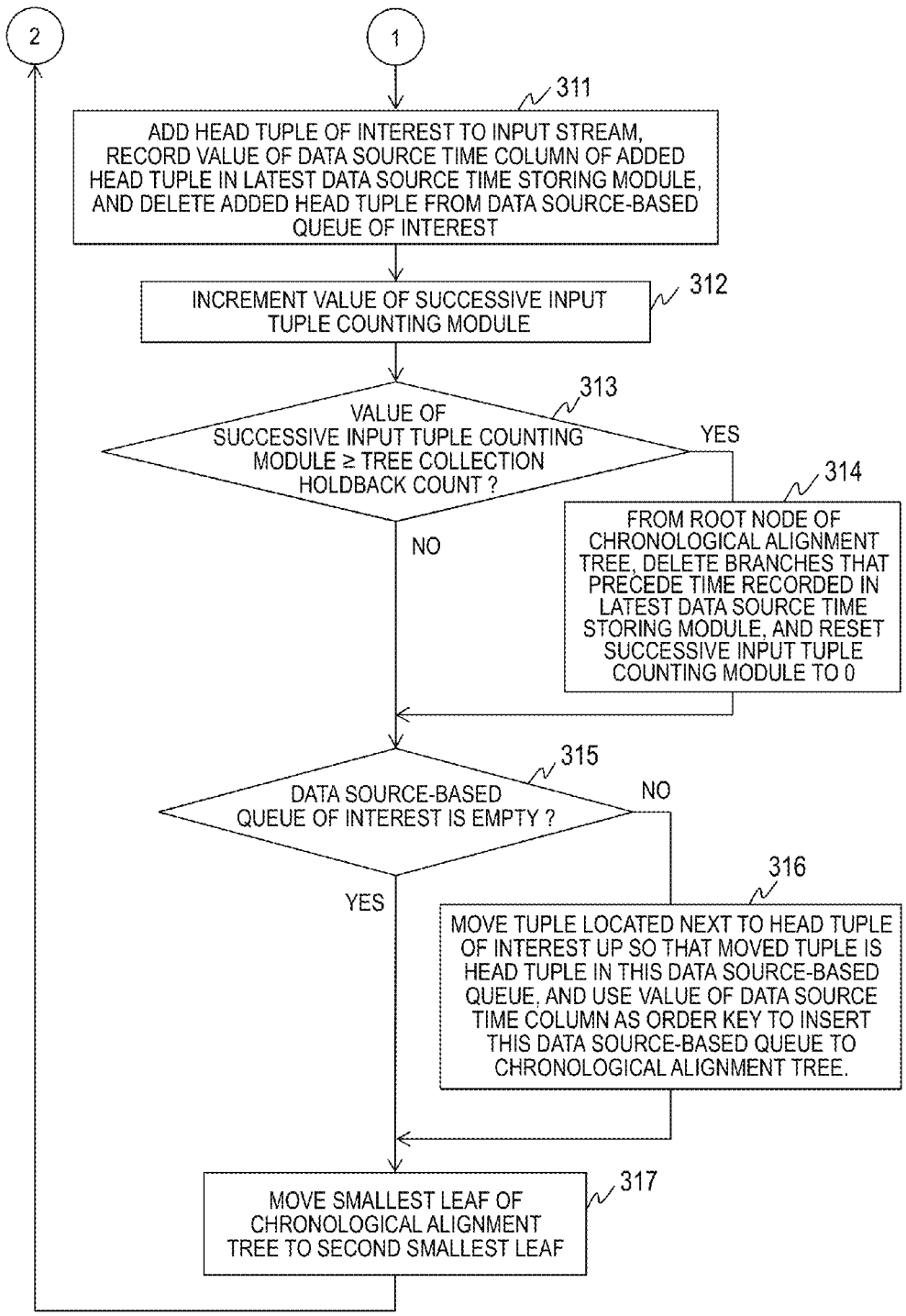
FIG. 3B is the second half of the flow chart for illustrating an example of processing that is executed in the tuple aligning module according to the embodiment of this invention.

FIG. 3A and FIG. 3B are a flow chart for illustrating an example of processing that is executed in the tuple aligning module 211. FIG. 3A is the first half of the flow chart and FIG. 3B is the second half of the flow chart. This is repeated processing that is executed each time one of the input tuples 121 is input to one of the input queues 212.

In Step 301, the tuple aligning module 211 obtains the input tuple 121 from the input queue 212, and obtains the current system time stamp from the system clock 216. The tuple aligning module 211 attaches the obtained system time stamp to the input tuple 121, thereby generating the holdback tuple 521.

In Step 302, the tuple aligning module 211 uses the value of the data source identification column 134 (a data source identifier: SID) of the holdback tuple 521 as a key to select one data source-based queue 219 from the data source-based queue storing module 215.

The tuple aligning module 211 determines in Step 303 whether or not the data source-based queue 219 selected in step S302 is found among the leaf nodes 613 of the chronological alignment tree 218. The tuple aligning module 211 proceeds to Step 305 when the selected data source-based queue 219 is found, and to Step 304 when the selected data source-based queue 219 is not found.

The tuple aligning module 211 determines in Step 305 whether or not the data source-based queue 219 is empty. The tuple aligning module 211 proceeds to Step 307 when the data source-based queue 219 is empty, and to Step 306 when the data source-based queue 219 is not empty. In Step S306, the tuple aligning module 211 adds the generated holdback tuple to the tail of the data source-based queue 219. The tuple aligning module 211 then proceeds to Step 309.

When the selected data source-based queue 319 is not found in Step 303, on the other hand, the tuple aligning module 211 generates in Step 304 the data source-based queue 219 that is associated with the identifier of the relevant data source 120, and stores the generated queue in the data source-based queue storing module 215. The tuple aligning module 211 then proceeds to Step 307.

In Step 307, the tuple aligning module 211 adds the generated holdback tuple 521 to the empty data source-based queue 219, and then proceeds to Step 308. In Step 308, the tuple aligning module 211 uses as an order key the value of the data source time column 135 (a data time stamp) of the generated holdback tuple 521 to insert the data source-based queue 219 of Step 307 to the place of the corresponding leaf node 613 in the chronological alignment tree 218. The tuple aligning module 211 then proceeds to Step 309.

The tuple aligning module 211 obtains in Step 309 the head tuple of the data source-based queue 219 that is located in the leaf node 613 that has the smallest (earliest) data time stamp in the chronological alignment tree 218. The tuple aligning module 211 then determines whether or not the current value of the system time stamp exceeds a value that is calculated by adding the processing holdback period 136 to the system time stamp of the obtained head tuple.

The tuple aligning module 211 proceeds to Step 311 of FIG. 3B when the system time stamp of the head tuple+the processing holdback period<the current system time stamp is true, and otherwise ends the whole processing without executing further steps than the addition of the generated holdback tuple 521.

In Step 311, the tuple aligning module 211 puts into the input stream 213 the input tuple 121 that is obtained by removing the system time stamp from the obtained head tuple. The tuple aligning module 211 stores the data time stamp of this input tuple 121 in the latest data source time storing module 220. The tuple aligning module 211 also deletes the obtained head tuple from the data source-based queue 219 in which the obtained head tuple has been queued.

Having put one input tuple 121 into the input stream 213, the tuple aligning module 211 increments the value of the successive input tuple counting module 217 in Step 312.

The tuple aligning module 211 determines in Step 313 whether or not the value of the successive input tuple counting module 217 is equal to or higher than the tree collection holdback count 137. The tuple aligning module 211 proceeds to Step 314 when the successive input tuple counting module 217 has a value equal to or higher than the tree collection holdback count 137, and deletes an empty branch from the chronological alignment tree 218. When the successive input tuple counting module 217 has a value lower than the tree collection holdback count 137, on the other hand, the tuple aligning module 211 proceeds to Step 315.

In Step 314, the tuple aligning module 211 deletes from the root node 611 of the chronological alignment tree 218 the branch 612 that precedes the time stored in the latest data source time storing module 220. The tuple aligning module 211 subsequently resets the value of the successive input tuple counting module 217 to 0, and then proceeds to Step 315.

The tuple aligning module 211 determines in Step 315 whether or not the data source-based queue 219 from which the head tuple has been deleted in Step 311 is empty. The tuple aligning module 211 proceeds to Step 317 when this data source-based queue 219 is empty, and to Step 316 when this data source-based queue 219 is not empty.

In Step 316, the tuple aligning module 211 moves up the holdback tuple 521 that is next to the head tuple deleted in Step 311 so that the moved holdback tuple 521 is now a head tuple. The tuple aligning module 211 uses as an order key the value of the data time stamp of the new head tuple to insert the data source-based queue 219 that stores the new head tuple to the place of the corresponding leaf node 613 in the chronological alignment tree 218. The tuple aligning module 211 then proceeds to Step 317.

In Step 317, the tuple aligning module 211 moves the leaf node 613 that has the smallest data time stamp in the chronological alignment tree 218 to the leaf node 613 that has the second smallest data time stamp.

The tuple aligning module 211 next returns to Step 309 of FIG. 3A to repeat the processing described above, which is repeated as long as a condition "head tuple system time stamp+processing holdback period 136<current system stamp" is satisfied in the leaf node 613 that has the smallest (earliest) data time stamp.

Through the processing described above, processing of storing a newly generated holdback tuple 521 in the data source-based queue 219 for each data source and processing of putting into the input stream 213 a head tuple that has the smallest data time stamp in the case where the processing holdback period 136 has elapsed, and processing of collecting an empty tree in the case where the value of the successive input tuple counting module 217 is equal to or higher than the tree collection holdback count 137 are executed under a given condition.

In Steps 301 to 312, the holdback tuple 524 is generated by attaching a system time stamp to the input tuple 124 and is stored in the data source-based queue Q01 as illustrated in FIG. 5. The data source-based queue Q01 is placed as the leaf node 613 that is under the branch RB, based on the data time stamp of the holdback tuple 524 that is the head tuple.

Figure 7:
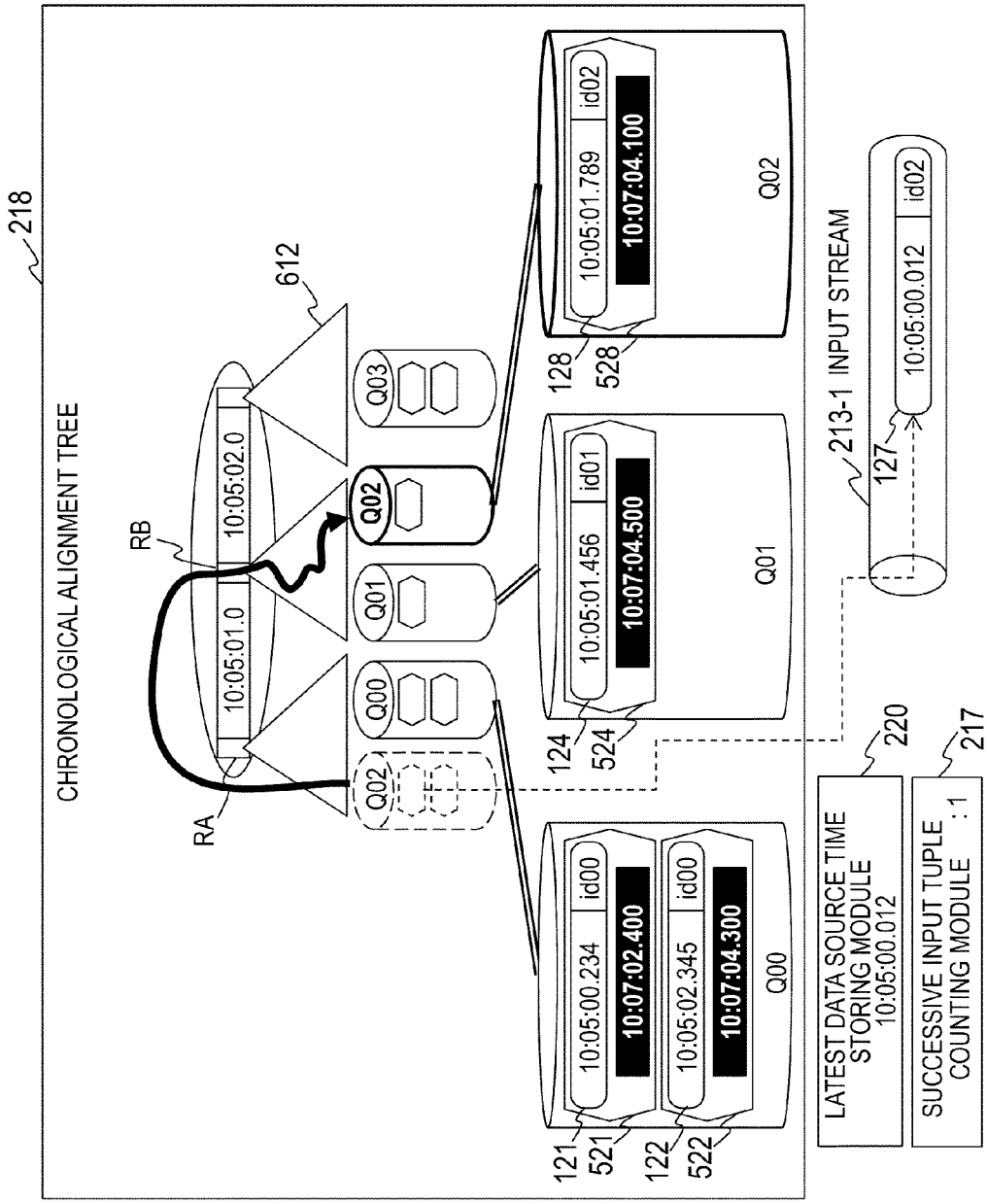
FIG. 7 is a block diagram for illustrating processing of moving a data source-based queue in holdback tuple processing that is executed for each data source separately according to the embodiment of this invention.

Processing executed in Steps 316 and 317 is described with reference to FIG. 7. FIG. 7 is a block diagram for illustrating processing of moving a data source-based queue in holdback tuple processing that is executed for each data source separately.

In an example illustrated in FIG. 7, the tuple aligning module 211 inserts the data source-based queue Q02 to the place of a different leaf node 613 after the input tuple 127 is extracted from the head tuple of the data source-based queue Q02 (from the holdback tuple 527) of FIG. 5 and is put into the input stream 213.

The tuple aligning module 211 first puts the input tuple 127 from the data source-based queue Q02 into the input stream 213 to empty the head tuple.

The tuple aligning module 211 next moves up the holdback tuple 528, which follows the head tuple, so that the holdback tuple 528 is now the head tuple of the data source-based queue Q02. The tuple aligning module 211 then uses as an order key the value of the data time stamp of the head tuple (528) to insert the data source-based queue Q02 as one of the leaf nodes 613 of the chronological alignment tree 218.

The data time stamp at the time the input tuple 127 is contained in the head tuple is "10:05:00.012", and the data source-based queue Q02 is therefore inserted in the leaf node 613 that is under the branch RA at a place where the value of the time is lower than the value of the head tuple of the data source-based queue Q00.

When the holdback tuple 528 becomes the head tuple in the data source-based queue Q02, on the other hand, the data time stamp of the input tuple 128 is "10:05:01.789", and the data source-based queue Q02 is therefore inserted as the leaf node 613 that is under the branch RB and that has a data time stamp larger than that of the data source-based queue Q01.

Through the processing described above, the tuple aligning module 211 moves the data source-based queue Q02 in which the head tuple has been updated to be placed under the branch 612 that corresponds to the data time stamp of the new head tuple. The tuple aligning module 211 can thus align the data source-based queues 219 on the chronological alignment tree 218 in the order of the data time stamps of the head tuples.

The definition of the data source-based queue Q02 is left in the leaf node 613 that is under the branch RA. As described later, the definition of the data source-based queue 219 from which all holdback tuples 521 have been cleared out remains, as well as the branch 612 and leaf node 613 of the queue. In the case where the data source-based queue Q02 becomes empty after the input tuple 127 is put into the input stream 213, the tuple aligning module 211 does not execute the moving (insertion) of the data source-based queue Q02 to another leaf node 613.

Figure 8:
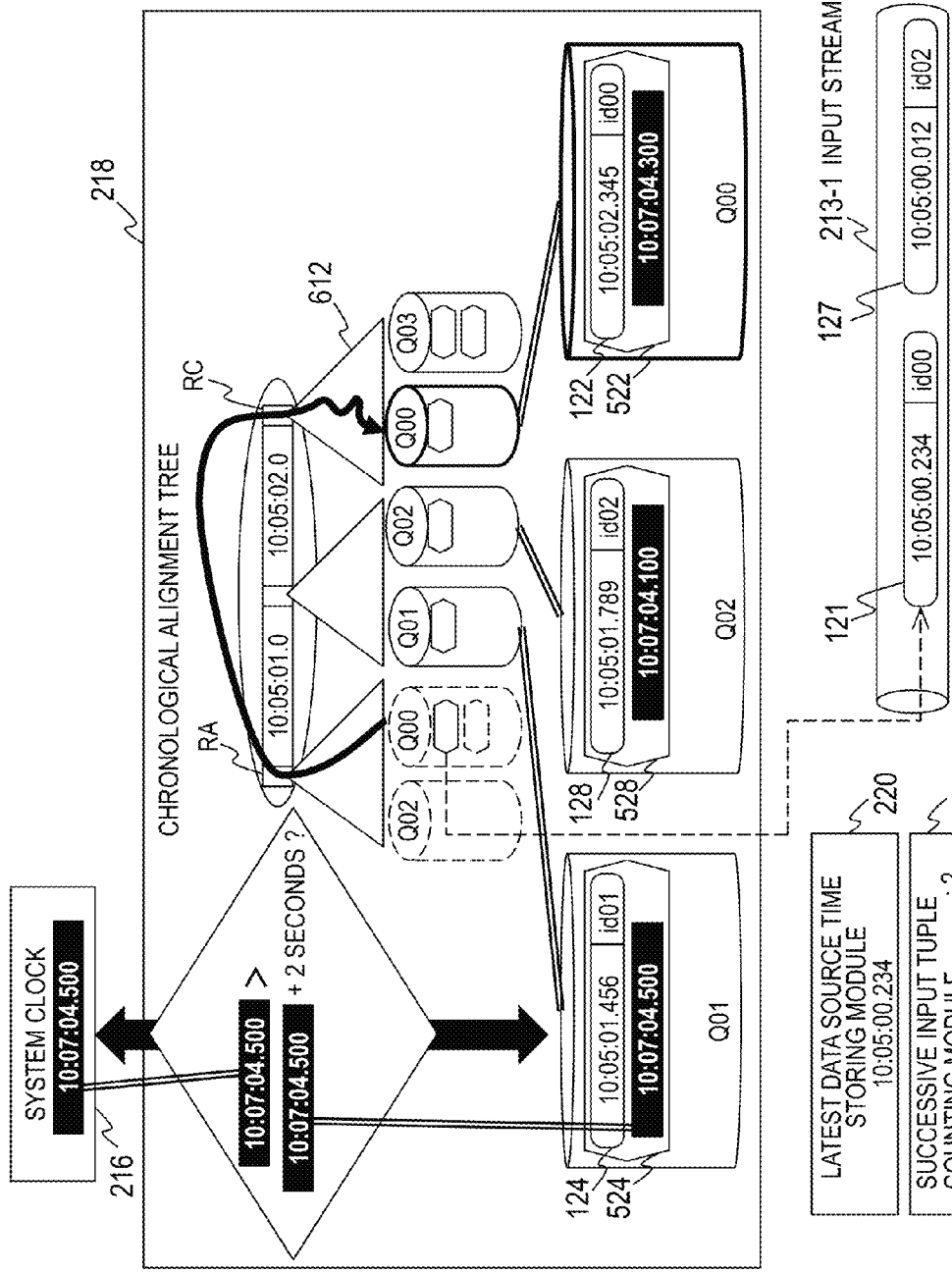
FIG. 8 is a block diagram for illustrating a state in which loading an input stream with tuples has been completed in the processing of the holdback tuples that is executed for each data source separately according to the embodiment of this invention.

FIG. 8 is a block diagram for illustrating a state in which loading an input stream with tuples has been completed in the processing of the holdback tuples 521 that is executed for each data source separately. In an example illustrated in FIG. 8, the data source-based queue Q00 has been inserted as a different leaf node 613 after the tuple aligning module 211 has extracted the input tuple 121 from the head tuple (the holdback tuple 521) of the data source-based queue Q00 of FIG. 5 and has put the extracted tuple into the input stream 213.

Processing executed in Step 309 of FIG. 3A is illustrated in the example of FIG. 8. The tuple aligning module 211 determines that the processing holdback period 136 has not been expired in the case where the current system time stamp value does not exceed a value that is obtained by adding the processing holdback period 136 (2 seconds) to a system time stamp value stored in the holdback tuple 524 in the leaf node 613 where the head tuple has the smallest data time stamp value. During the processing holdback period 136, the tuple aligning module 211 ends the processing without putting the input tuples 121 to an input stream.

In this invention, putting the input tuple 121 that has arrived at the stream data processing server 100 into the input stream 213 is held back until a value that is obtained by adding the processing holdback period 136 to a system time stamp value indicating the time of arrival of the input tuple 121 is reached. This enables the stream data processing server 100 to sort the input tuples 121 in the order of data time stamps within the given processing holdback period 136, even when the length of delay in a communication path varies from one data source to another.

Figure 9:
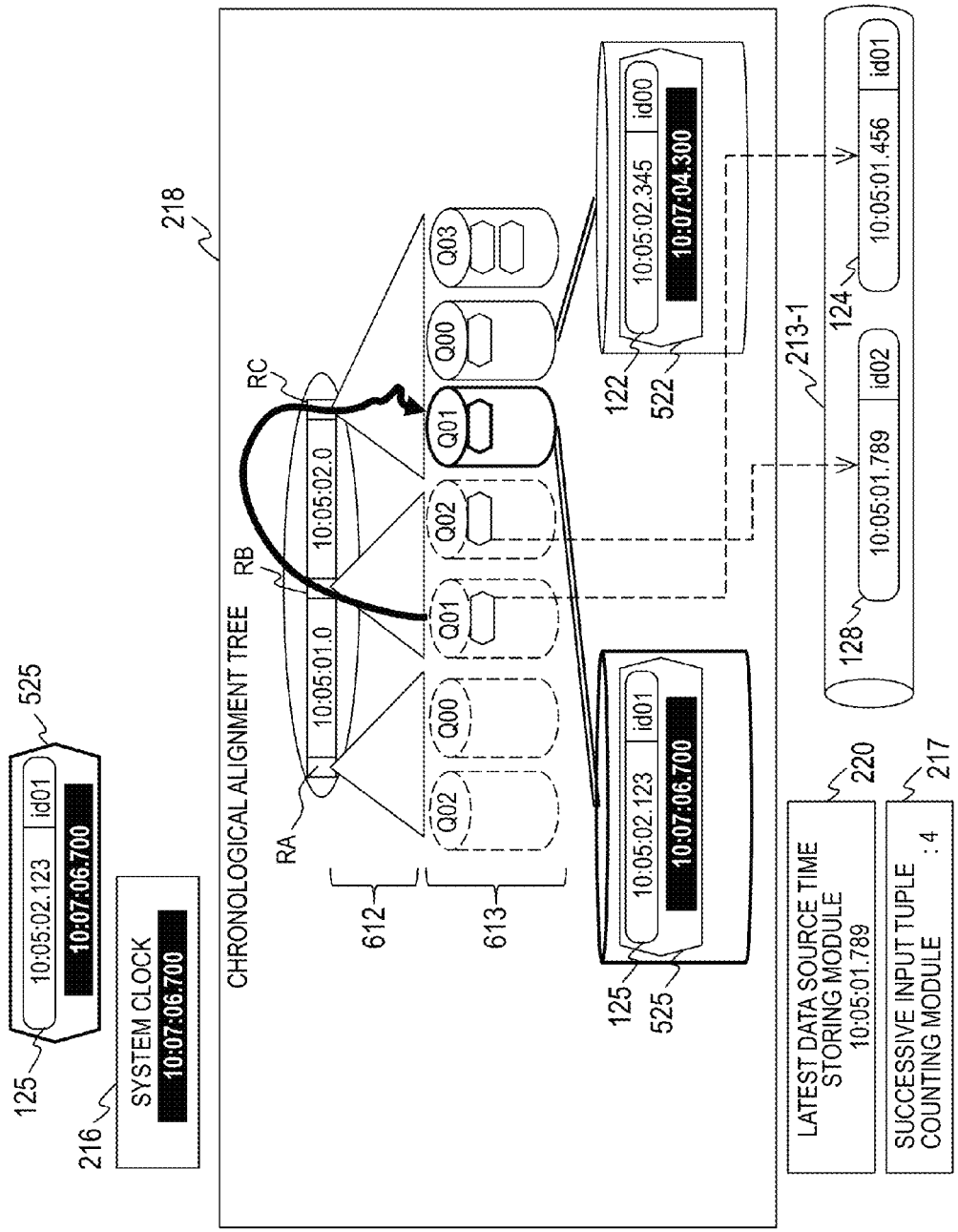
FIG. 9 is a block diagram for illustrating a state in which loading an input stream with tuples has been completed based on the tree collection holdback count in the processing of the holdback tuples that is executed for each data source separately according to the embodiment of this invention.
Figure 10:
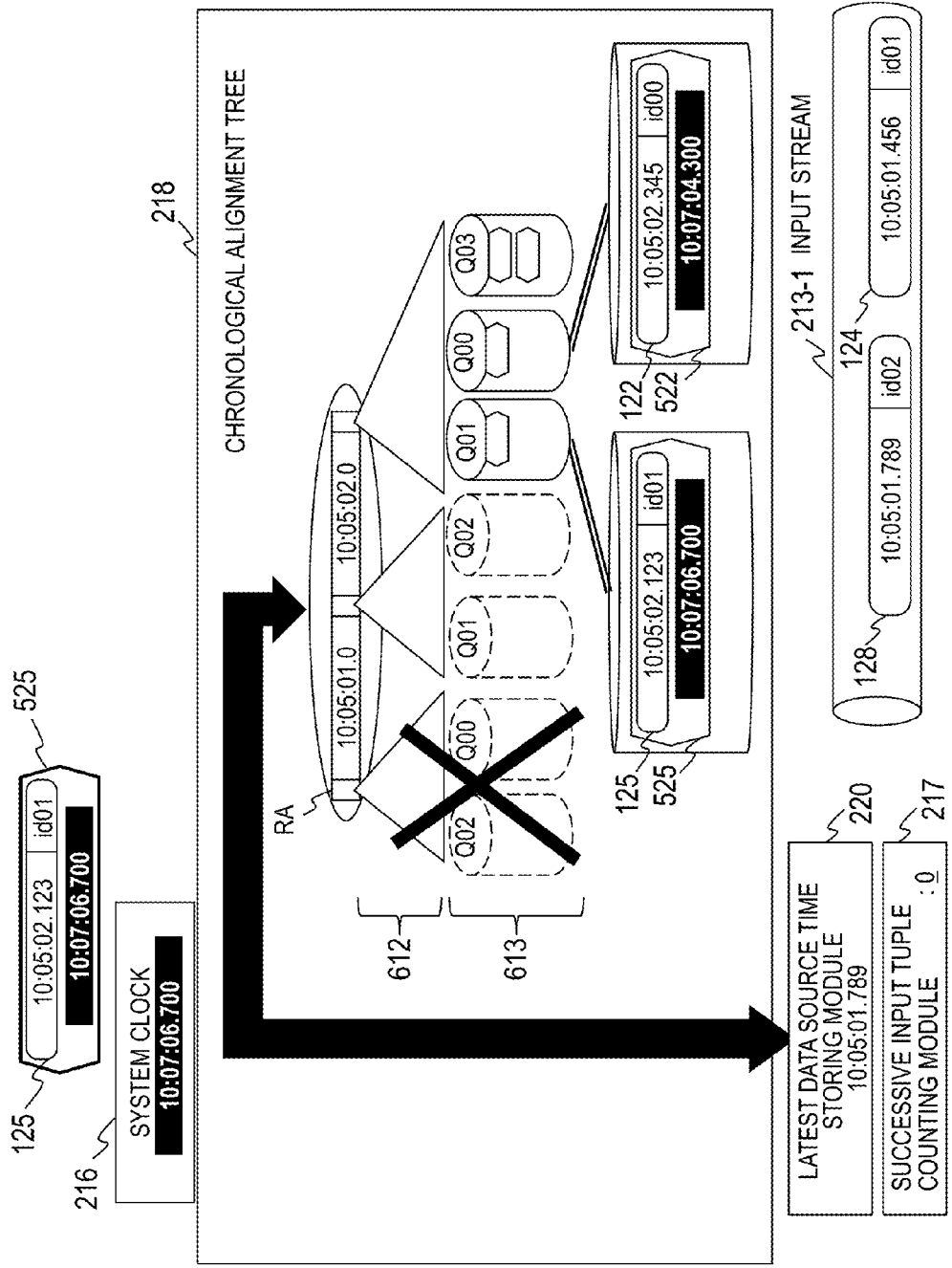
FIG. 10 is a block diagram for illustrating processing of deleting the data source-based queues according to the embodiment of this invention.

FIG. 9 and FIG. 10 are diagrams for illustrating processing of deleting the data source-based queues Q00 and Q02, the leaf node 613, and the branch 612 that are empty. This processing corresponds to Steps 311 to 314 of FIG. 3B.

In FIG. 9, the tuple aligning module 211 attaches a system time stamp to the input tuple 125 received by the stream data processing server 100, and stores the input tuple 125 with the system time stamp attached thereto in the data source-based queue Q01 as a holdback tuple 525.

The tuple aligning module 211 then puts the head tuple (128) of the data source-based queue Q02 into the input stream 213. The tuple aligning module 211 stores in the latest data source time storing module 220 the data time stamp value (10:05:01.789) of the input tuple 128 put into the input stream 213 (Step 311 of FIG. 3B).

The tuple aligning module 211 next increments the value of the successive input tuple counting module 217 (Step 312 of FIG. 3B). The tuple aligning module 211 determines whether or not the increment has made the value of the successive input tuple counting module 217 equal to or higher than the tree collection holdback count 137 (4 times) (Step 313 of FIG. 3B).

The successive input tuple counting module 217 has a value "4", and the tuple aligning module 211 accordingly deletes from the root node 611 of the chronological alignment tree 218 the branch 612 and the leaf node 613 that precede the time of the latest data source time storing module 220 (10:05:01.789) (Step 314 of FIG. 3B).

In an example illustrated in FIG. 9, the data time stamp of the input tuple 128, which is most recently put into the input stream 213, is "10:05:01.789", and a branch preceding the time of this stamp is RA. The branch 612 that is RA and the leaf node 613 that is under RA are therefore to be deleted.

In FIG. 10, the tuple aligning module 211 deletes at once the branch 612 that precedes the time of the latest data source time storing module 220 (10:05:01.789) and the leaf node 613 that is under this branch 612. Thereafter, the tuple aligning module 211 resets the value of the successive input tuple counting module 217 to 0.

The processing of deleting the empty leaf node 613 and the empty branch 612 in the chronological alignment tree 218 increases the load on the computer. In this invention, the leaf node 613 and the branch 612 that contain an empty data source-based queue are deleted at once after the number of the input tuples 121 that are put into the input stream 213 reaches a threshold or higher. This prevents frequent execution of processing of deleting the empty leaf node 613 and the empty branch 612, thereby keeping the stream data processing performance from dropping.

CONCLUSION

According to this invention, the stream data processing server 100 thus stores the input tuples 121 in the data source-based queue 219 for each data source 120 separately, and sets the input tuple 121 that has the smallest (earliest) data time stamp as a head tuple. The tuple aligning module 211 sorts the data source-based queues 219 in the order of the data time stamps of the head tuples (in time series).

The tuple aligning module 211 attaches to the input tuple 121 received by the stream data processing server 100 a system time stamp that indicates the time of reception, and manages the input tuple 121 with the system stamp attached thereto as the holdback tuple 521. The tuple aligning module 211 holds back from putting the input tuple 121 into the input stream 213 until the system time stamp of the holdback tuple 524 exceeds the processing holdback period 136.

When the system time stamp exceeds the processing holdback period 136, the tuple aligning module 211 identifies the data source-based queue 219 where the head tuple has the smallest data time stamp, and selects the head tuple of the identified queue, to thereby put the input tuples 121 in the order of data time stamps.

In this manner, input tuples can be put into the input stream 213 in the order of data time stamps within the processing holdback period 136 even when the length of delay till the arrival at the stream data processing server 100 varies from one data source 120 to another. In other words, the order of the input tuples 121 put into the input stream 213 within the processing holdback period 136 is guaranteed to be the order of data time stamps. The stream data processing server 100 is improved in the precision of processing as a result.

In addition, by sorting the data source-based queues 219 with the use of the chronological alignment tree 218, the input tuple 121 to be put into the input stream 213 can be selected efficiently from the data source-based queues 219 where the head tuple has the smallest data time stamp. This reduces the load of processing of sorting the input tuples 121 so that the input tuples 121 are put into the input stream 213 in the order of data time stamps.

This invention also includes holding back the processing of deleting the empty data source-based queue 219, the empty leaf node 613, and the empty branch 612 from which the input tuples 121 have been cleared out, until the number of times one input tuple 121 is put into the input stream 213 (the value of the successive input tuple counting module 217) reaches a given value. This prevents frequent execution of the processing of deleting the branch 612 and the leaf node 613 from the chronological alignment tree 218, which helps the stream data processing server 100 to maintain stream data processing performance.

While the embodiment described above deals with an example in which a system time stamp is used as a value that determines the order of the input tuples 121 arriving at the stream data processing server 100, other unique values may be used instead.

The embodiment described above deals with an example in which the data source-based queues 219 are arranged as the leaf nodes 613 of the chronological alignment tree 218, which has the configuration of a B+ tree. However, this invention is not limited thereto, and pointers of the data source-based queues 219 may be managed with the use of the chronological alignment tree 218. Alternatively, the data source-based queues 219 or pointers of the data source-based queues 219 may be managed on a time-series alignment without using the chronological alignment tree 218.

The embodiment described above deals with an example in which the tuple aligning module 211 uses the input tuple aligning settings 133 that are received from the host computer 130 to sort the order of the input tuples 121. The input tuple aligning settings 133 may instead be set in the tuple aligning module 211 in advance.

The tuple aligning module 211 in the embodiment described above is provided inside each tuple input module 210. Alternatively, the tuple input module 210 and the tuple aligning module 211 may form a pair.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

What is claimed is:

1. A stream data processing method for processing, on a computer comprising a processor and a memory, input tuples that are received from a plurality of data sources, the stream data processing method comprising:

a first step of setting, by the computer, a processing holdback period by the computer;

a second step of receiving, by the computer, the input tuples comprising data time stamps that are attached by the plurality of data sources and identifiers of the plurality of data sources;

a third step of generating, by the computer, a holdback tuple by attaching to each of the received input tuples a system time stamp that indicates a time of reception of the each of the received input tuples;

a fourth step of storing, by the computer, the holdback tuple in a data source-based queue that is associated with the identifier of the data source of the holdback tuple;

a fifth step of reading, by the computer, data time stamps of hold back tuples at heads of the data source-based queues, and sorting the data source-based queues in an order of the data time stamps of the head holdback tuples;

a sixth step of identifying, by the computer, a data source-based queue that stores at a head a holdback tuple that has a smallest data time stamp value, reading a system time stamp of the head holdback tuple, and determining whether or not a current system time stamp value is larger than a value that is obtained by adding the processing holdback period to the read system time stamp;

a seventh step of obtaining, by the computer, when it is determined that the current system time stamp value is larger, an input tuple from the head holdback tuple of the identified data source-based queue, and putting the obtained input tuple into an input stream thereby maintaining an order of time stamps of the input tuples; and an eighth step of executing, by the computer, a given query for the input tuple put into the input stream.

2. The stream data processing method according to claim 1, wherein, in the fifth step, the data source-based queues are stored in a balanced tree comprising a time-series root node, in places that correspond to the data time stamps of the head holdback tuples of the data source-based queues, and the data source-based queues are sorted in the order of the data time stamps of the head holdback tuples.

3. The stream data processing method according to claim 2, the seventh step comprising:

obtaining the input tuple from the head holdback tuple of the identified data source-based queue, and putting the obtained input tuple into the input stream;

moving up a holdback tuple that is next to the head of the identified data source-based queue so that the moved holdback tuple is now the head holdback tuple; and moving the identified data source-based queue to a place under the root node that corresponds to a data time stamp of the holdback tuple moved up to the head.

4. The stream data processing method according to claim 3, the seventh step comprising:

obtaining the input tuple from the head holdback tuple of the identified data source-based queue, and putting the obtained input tuple into the input stream; and deleting, when the identified data source-based queue becomes empty, a tree that stores the identified data source-based queue each time a number of times the input tuple is input to the input stream reaches a given tree collection holdback count.

5. The stream data processing method according to claim 4, wherein, in the first step, the processing holdback period and the tree collection holdback count are received.

6. A stream data processing device for processing, on a computer comprising a processor and a memory, input tuples that are received from a plurality of data sources, the stream data processing device comprising:
a tuple input module configured to receive the input tuples comprising data time stamps that are attached by the plurality of data sources and identifiers of the plurality of data sources;
a tuple aligning module configured to correct an order of the received input tuples and then put the input tuples into an input stream; and
a query executing module configured to execute a given query for the input tuples put into the input stream,
wherein the tuple aligning module is configured to:
generate a holdback tuple by attaching to each of the received input tuples a system time stamp that indicates a time of reception of the each of the received input tuples;
store the holdback tuple in a data source-based queue that is associated with the identifier of the data source of the holdback tuple;
read data time stamps of hold back tuples at heads of the data source-based queues, and sort the data source-based queues in an order of the data time stamps of the head holdback tuples;
identify a data source-based queue that stores at a head a holdback tuple that has a smallest data time stamp value, read a system time stamp of the head holdback tuple, and determine whether or not a current system time stamp value is larger than a value that is obtained by adding a given processing holdback period to the read system time stamp; and
obtain, when it is determined that the current system time stamp value is larger, an input tuple from the head holdback tuple of the identified data source-based queue, and put the obtained input tuple into the input stream thereby maintaining an order of time stamps of the input tuples, and
execute, by the query executing module, the given query for the input tuple put into the input stream.

7. The stream data processing device according to claim 6, wherein the tuple aligning module is configured to store the data source-based queues in a balanced tree comprising a time-series root node, in places that correspond to the data time stamps of the head holdback tuples of the data source-based queues, and to sort the data source-based queues in the order of the data time stamps of the head holdback tuples.

8. The stream data processing device according to claim 7, wherein the tuple aligning module is configured to:
obtain the input tuple from the head holdback tuple of the identified data source-based queue, and put the obtained input tuple into the input stream;
subsequently move up a holdback tuple that is next to the head of the identified data source-based queue so that the moved holdback tuple is now the head holdback tuple; and
move the identified data source-based queue to a place under the root node that corresponds to a data time stamp of the holdback tuple moved up to the head.

9. The stream data processing device according to claim 8, wherein the tuple aligning module is configured to:
obtain the input tuple from the head holdback tuple of the identified data source-based queue, and put the obtained input tuple into the input stream; and
subsequently delete, when the identified data source-based queue becomes empty, a tree that stores the identified data source-based queue each time a number of times the input tuple is input to the input stream reaches a given tree collection holdback count.

10. The stream data processing device according to claim 9, further comprising a receiving module configured to receive the processing holdback period and the tree collection holdback count.

* * * * *